Patented July 18, 1933

1,918,628

UNITED STATES PATENT OFFICE

LOUIS BENDA, OF FRANKFORT-ON-THE-MAIN, GERMANY, ASSIGNOR TO WINTHROP CHEMICAL COMPANY, INC., OF NEW YORK, N. Y., A CORPORATION OF NEW YORK

SALTS OF DIALKYLAMINOARYLPHOSPHINOUS ACIDS

No Drawing. Application filed July 16, 1932, Serial No. 623,011, and in Germany July 24, 1931.

The present invention relates to a process of preparing salts of dialkylaminoarylphosphinous acids.

The salts of dialkylaminoarylphosphinous acids, which are described, for instance, in U. S. Patent No. 1,607,113, dated November 16, 1926, filed in the name of Louis Benda and Werner Schmidt, have valuable therapeutic properties. They are, however, not stable in a solid state, but after being stored for a short time they show signs of decomposition already at ordinary temperature and they assume a disagreeable odor and taste. Therefore, they could hitherto not be administered orally.

Now I have found that completely stable products, which do not decompose at an elevated temperature, are obtained by heating in an open vessel crystallized salts of the following formula

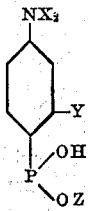

wherein X stands for an alkyl radical, Y for hydrogen or a substituent of the group consisting of alkyl, alkoxy and dialkylamino, and Z for an alkali metal.

This operation is preferably carried out at a temperature between about 70° C. and about 120° C. The salts may be heated under a reduced pressure. The duration of heating depends upon the degree of temperature and the pressure. It varies between about 2 hours and about 4 days. The heating operation is preferably continued until the weight of the substance heated remains constant.

The following compounds, for instance, may be subjected to the process described: the sodium salt of 4-dimethylamino-2-methylbenzene-1-phosphinous acid; the potassium salt of 4-dimethylamino-2-methylbenzene-1-phosphinous acid; the sodium salt of 4-diethylamino-2-methylbenzene-1-phosphinous acid; the sodium salt of 4-dimethylamino-2-methoxybenzene-1-phosphinous acid; the sodium salt of 4-dimethylaminobenzene-1-phosphinous acid; the sodium salt of 4-dimethylamino-2-ethoxybenzene-1-phosphinous acid; the sodium salt of 4-dimethylamino-2-dimethylaminobenzene-1-phosphinous acid; the sodium salt of 4-dimethylamino-2-diethylaminobenzene-1-phosphinous acid; the sodium salt of 4-dimethylamino-2-ethylbenzene-1-phosphinous acid.

The substances thus obtained may be stored for any time, also in tropics and may be used in the form of a powder or tablets.

The following examples illustrate the invention.

(1) 2 kilos of the crystallized sodium salt of 4-dimethylamino-2-methylbenzene-1-phosphinous acid are heated under reduced pressure for about 4 hours at 100° C. until the weight remains constant. It is not absolutely necessary to work at 100° C.; this may also be worked at a lower temperature. The product thus obtained is preferably stored in an air-tight vessel. It forms a colorless powder which is very easily soluble in water.

(2) 1 kilo of the crystallized sodium salt of 4 - dimethylamino - 2 - methylbenzene - 1 - phosphinous acid is heated on the water bath for 3 days until the weight remains constant. The product thus obtained can be stored in a closed vessel even in the incubator or at ordinary temperature without undergoing alteration; a test portion stored in this manner for 5 months does not show any signs of decomposition. However, a test portion of the starting material has a distinct odor of dimethyl-meta-toluidine, after it has stood for 24 hours in the incubator.

(3) 1 kilo of the crystallized sodium salt of 4 - dimethylaminobenzene - 1 - phosphinous acid is heated under reduced pressure for 24 hours at 100° C.

When a test portion of the starting material is stored for 24 hours in a closed vessel at 37° C., it has a disagreeable odor of dimethylaniline, but the product obtained according to my invention can be stored for months without undergoing alteration; when storing it for a prolonged time, it does not at all show any signs of decomposition.

(4) 1 kilo of the crystallized sodium salt of 4-dimethylamino-2-methylbenzene-1-phosphinous acid is heated under reduced pressure for 24 hours at 80° C. The hygroscopic odorless salt does not alter in the vacuum chamber at 37° C. and can be stored without showing any signs of decomposition, whereas a test portion of the starting material kept in a closed vessel in the incubator has already after 24 hours a disagreeable odor of diethyl-meta-toluidine and already begins to decompose after being stored for 4 weeks in a closed flask at ordinary temperature.

I claim:

1. The process which comprises heating a crystallized compound of the following formula

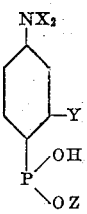

wherein X stands for an alkyl radical, Y for hydrogen or a substituent of the group consisting of alkyl, alkoxy and dialkylamino, and Z for an alkali metal, at a temperature between about 70° C. and about 120° C.

2. The process which comprises heating a crystallized compound of the following formula

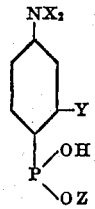

wherein X stands for an alkyl radical, Y for hydrogen or a substituent of the group consisting of alkyl, alkoxy and dialkylamino, and Z for an alkali metal, at a temperature between about 70° C. and about 120° C. under a reduced pressure.

3. The process which comprises heating a crystallized compound of the following formula

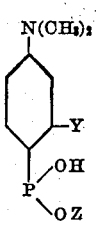

wherein Y stands for hydrogen or a substituent of the group consisting of alkyl, alkoxy and dialkylamino, and Z stands for an alkali metal, at a temperature between about 70° C. and about 120° C.

4. The process which comprises heating a crystallized compound of the following formula

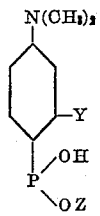

wherein Y stands for hydrogen or a substituent of the group consisting of alkyl, alkoxy and dialkylamino, and Z stands for an alkali metal, at a temperature between about 70° C. and about 120° C. under a reduced pressure.

5. The process which comprises heating the crystallized sodium salt of 4-dimethylamino-2-methylbenzene-1-phosphinous acid at a temperature of about 100° C. under a reduced pressure.

6. The process which comprises heating the crystallized sodium salt of 4-dimethylaminobenzene-1-phosphinous acid at a temperature of about 100° C. under a reduced pressure.

7. The products obtainable by heating a crystallized compound of the following formula:

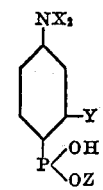

wherein X stands for an alkyl radical, Y for hydrogen or a substituent of the group consisting of alkyl, alkoxy and dialkylamino, and Z for an alkali metal, at a temperature between about 70° C. and about 120° C., said products being colorless stable powders.

8. The products obtainable by heating a crystallized compound of the following formula:

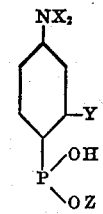

wherein X stands for an alkyl radical, Y for hydrogen or a substituent of the group consisting of alkyl, alkoxy and dialkylamino, and Z for an alkali metal, at a temperature between about 70° C. and about 120° C. under a reduced pressure, said products being colorless stable powders.

9. The products obtainable by heating a crystallized compound of the following formula:

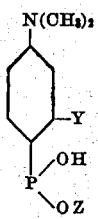

wherein Y stands for hydrogen or a substituent of the group consisting of alkyl, alkoxy and dialkylamino, and Z stands for an alkali metal, at a temperature about 70° C. and about 120° C., said products being colorless stable powders.

10. The products obtainable by heating a crystallized compound of the following formula:

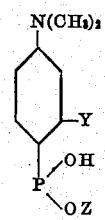

wherein Y stands for hydrogen or a substituent of the group consisting of alkyl, alkoxy and dialkylamino, and Z stands for an alkali metal, at a temperature between about 70° C. and about 120° C. under a reduced pressure, said products being colorless stable powders.

11. The product obtainable by heating the crystallized sodium salt of 4-dimethylamino-2-methylbenzene-1-phosphinous acid at a temperature of about 100° C. under a reduced pressure, said product being a colorless stable powder.

12. The product obtainable by heating the crystallized sodium salt of 4-dimethylaminobenzene-1-phosphinous acid at a temperature of about 100° C. under a reduced pressure, said product being a colorless stable powder.

LOUIS BENDA.